P. WALLENBORN.
Clothes-Line Reel and Support.
No. 217,915. Patented July 29, 1879.
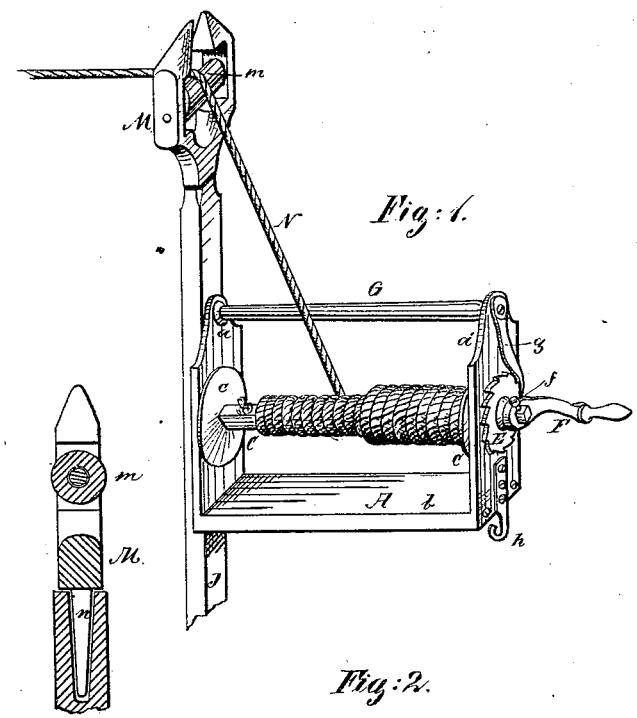
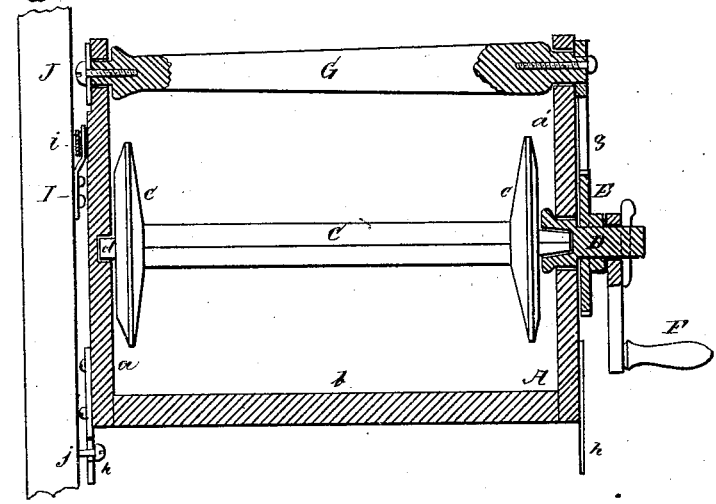
Witnesses:
Inventor,
Peter Wallenborn
By Wm H Lotz
Attorney

UNITED STATES PATENT OFFICE.

PETER WALLENBORN, OF CHICAGO, ILLINOIS.

IMPROVEMENT IN CLOTHES-LINE REEL AND SUPPORT.

Specification forming part of Letters Patent No. 217,915, dated July 29, 1879; application filed March 31, 1879.

*To all whom it may concern:*

Be it known that I, PETER WALLENBORN, of Chicago, in the county of Cook and State of Illinois, have invented a new and useful Improvement in Clothes-Line Reels; and that the following is a full, clear, and exact description thereof, reference being had to the accompanying drawings, which form part of this specification.

The nature of my invention relates to reels upon which to wind the clothes-line for storing away while not in use, and by which the line can be stretched after the clothes have been suspended thereto; and my invention consists in the peculiar construction and arrangement of such a reel, as will be more fully hereinafter explained.

In the drawings, Figure 1 represents a perspective view of the reel when attached to a clothes-line post, and Fig. 2 represents a longitudinal vertical section through the center of the same.

Like letters in the several figures of the drawings designate like parts.

A is the frame, composed of two uprights, $a\ a'$, which are rigidly connected by a base, $b$. C is the reel or spool, consisting of a square shaft with flanges $c\ c$, and with a journal, $d$, on one end, to be inserted in a socket-bearing of frame-upright $a$, and a square tapering projection to its opposite end, which will enter a correspondingly square socket in journal D, pivoted into frame-upright $a'$, and having mounted upon its exterior squared end a ratchet-wheel, E, and crank F, both removably secured thereon by a cross-pin or key, $f$, which is inserted into an eye in the end of said journal D.

In holes through the upper ends of frame-uprights $a\ a'$ are pivoted the ends of a tapering round bar, G, upon one end of which is rigidly secured a pawl, $g$, engaging with the teeth of ratchet-wheel E. This bar G forms the handle for carrying the reel-frame, when at the same time the said pawl is under control for holding it clear of the ratchet-teeth of wheel E, or so as to lock therewith, as may be desirable for unwinding or for stretching the clothes-line.

Hooks $h\ h$ are secured to the base of the frame A, for suspending the same in suitable staples to the wall or a post, and $i$ is a loop-like fixture to the side of frame-upright $a$, which will engage with a hook, I, on the clothes-line post J, when at the same time one of the hooks $h$ will couple with the head of a screw or spike, $j$, for vertically sustaining the frame A against an upward strain.

A roller or pulley, $m$, pivoted between the prongs of a fork-like casting, M, having a conical shank, $n$, which is inserted into a socket in the upper extremity of clothes-line post J, will form a suitable support for the line N, for guiding the same from the reel to a more elevated position, whence the line is stretched from post to post.

For stretching the clothes-line, its end is secured to the first post or other support, and thence by carrying the reel by bar G, and so that the pawl is kept off the ratchet-wheel, in the direction from post to post, to which the line is suspended over hooks or pulleys, until the end post is reached, the reel-frame is rigidly attached thereto, when, by turning the crank, the line can be stretched with ease to any desired degree, and for gathering in the clothes-line again it is wound upon the reel by following the direction of the line while turning the crank.

As will be noticed by the arrangement of an independent crank-journal, D, which I intend to make of metal, for coupling with the end of the spool, the latter is much simplified in its construction, and by connecting the upright $a$ to base $b$ of the frame with a hinge or in any other suitable manner, so as to have easy access for removing and exchanging the spool, such can be readily done without disconnecting the crank; and by the removable attachment of the reel to a post, J, having a roller, $m$, the said reel can be placed in a convenient position for turning the crank, while the clothes-line can be stretched thereby when in a much more elevated position.

Another advantage in this reel is that the handle-bar G will control the pawl $g$, thereby preventing the clothes-line from unwinding more than desirable while suspending the same over the posts.

I do not wish to be restricted to the use of the particular device herein shown and described for attaching the reel-frame to the clothes-line post, as many other locking devices may answer my purposes equally well.

What I claim as new, and desire to secure by Letters Patent, is—

In combination with frame A, spool C, ratchet-wheel E, and crank F, the pivoted handle-bar G holding pawl $g$, substantially as and for the purposes described and shown.

PETER WALLENBORN.

Witnesses:
EMIL H. FROMMANN,
ERNST JEBSEN.